No. 639,933.  
F. W. PREUSSEL.  
ACETYLENE GAS GENERATOR.  
(Application filed Oct. 28, 1898.)  
Patented Dec. 26, 1899.
(No Model.)
2 Sheets—Sheet 1.
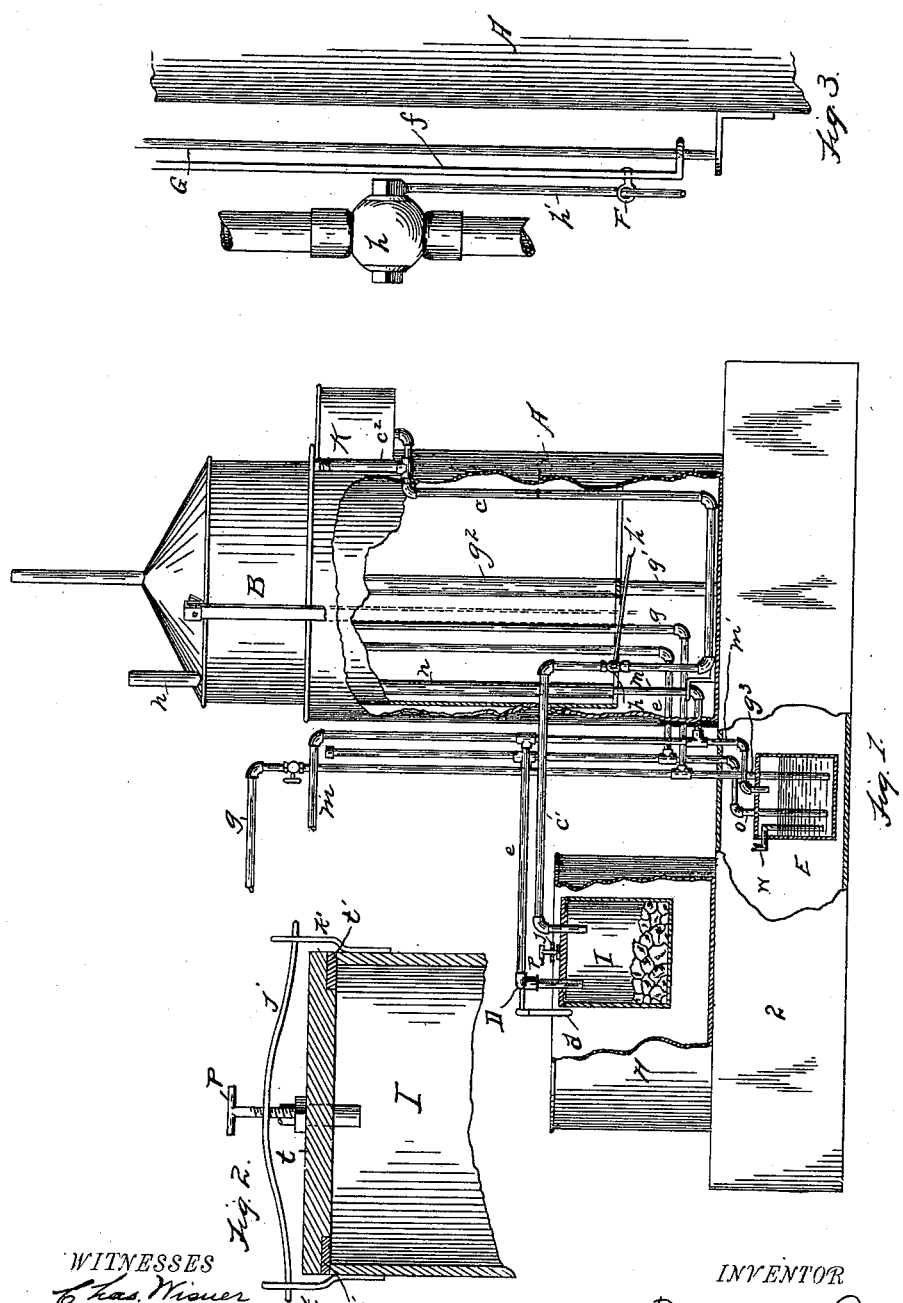
WITNESSES  
Chas. Wisner  
Marion A. Ruer
INVENTOR  
Frank W. Preussel  
By Parker & Burton  
Attorneys.

No. 639,933. Patented Dec. 26, 1899.
F. W. PREUSSEL.
ACETYLENE GAS GENERATOR.
(Application filed Oct. 28, 1898.)
(No Model.) 2 Sheets—Sheet 2.
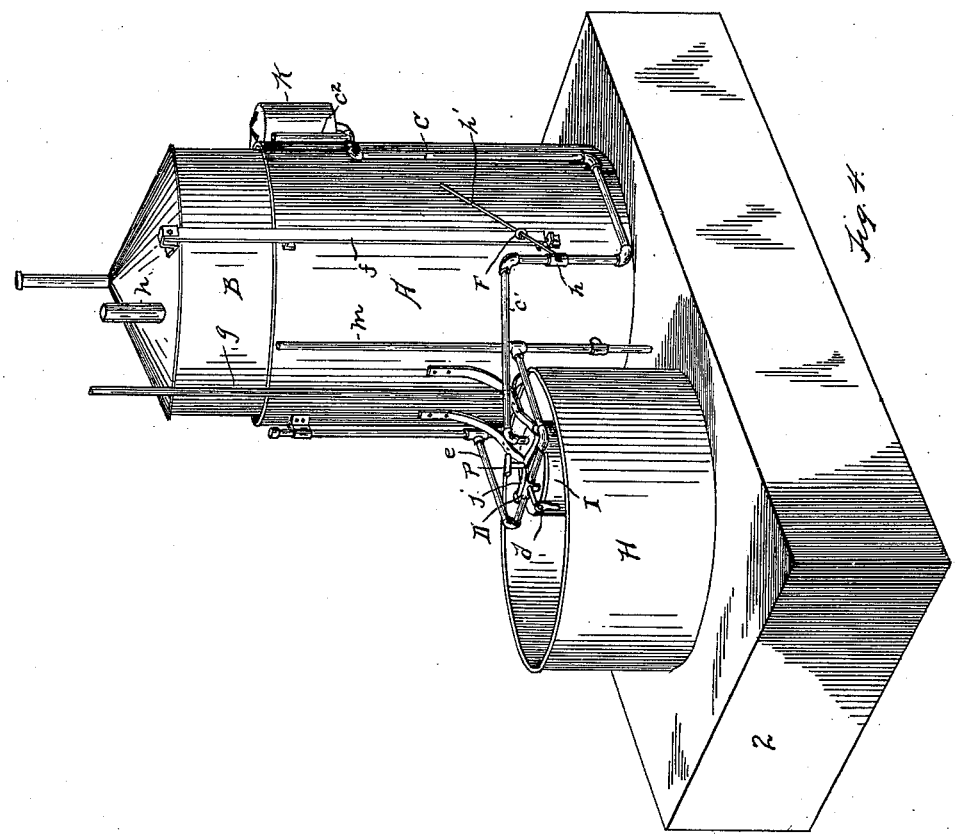
WITNESSES
Chas. Wiener
Marion A. Reen
INVENTOR
Frank W. Preussel
By Parker & Burton
Attorneys.

UNITED STATES PATENT OFFICE.

FRANK W. PREUSSEL, OF MOUNT CLEMENS, MICHIGAN.

ACETYLENE-GAS GENERATOR.

SPECIFICATION forming part of Letters Patent No. 639,933, dated December 26, 1899.

Application filed October 28, 1898. Serial No. 694,849. (No model.)

*To all whom it may concern:*

Be it known that I, FRANK W. PREUSSEL, a citizen of the United States, residing at Mount Clemens, county of Macomb, State of Michigan, have invented a certain new and useful Improvement in Acetylene-Gas Generators; and I declare the following to be a full, clear, and exact description of the invention, such as will enable others skilled in the art to which it pertains to make and use the same, reference being had to the accompanying drawings, which form a part of this specification.

This improvement relates to acetylene-gas generators, and has for its object improvements in that class of generators in which the carbid is subjected to water in a closed tank of fixed and constant capacity and the gas emanating from the generator is conducted to a holder or gasometer of varying capacity, where it is stored preparatory to use. From the gasometer the gas passes to the place of use through ordinary gas-pipes. This system of generating, storing, and using gas necessitates the use of piping the open ends of which are constantly in an atmosphere that is saturated with moisture. Those ends of the pipe which are in the generator are in an atmosphere saturated with moisture because of the heat incident to the chemical action of the water on the carbid; and one object of the invention is to collect all the concentrated moisture in a drip-tank in which drip-pipes running from the several pipes of the machine are entered, part of them being submerged in a connected drip-water, which is utilized as a seal to the subordinate pipes. I have also found that if the acetylene gas be generated in a tank to which only sufficient water is admitted to produce the necessary chemical action the gas becomes heated in the process of generation, and if gas that has been so heated in generation be used for lighting purposes it makes a very poor flame, deficient in light and much less economical than if the gas be generated under such conditions that it will remain cool. I have found that the poor quality of the gas due to heating during the process of generation is due to some deterioration of the gas itself and is not simply due to the fact that it is heated and used while heated. Attempts have been made to cool the gas by passing it through a coil in a water-tank or by some similar process of cooling; but this does not entirely overcome the difficulty, inasmuch as if the gas has once been injured by overheating it does not recover its qualities on being cooled; and another object of this invention is to provide means by which the generator is kept constantly cool, and the gas generated in this cool generator is not itself heated to so high a degree as to be injured in its illuminating qualities.

Another object of the invention is to provide a suitable safety appliance to the gasometer, such that if the generation of gas is for any reason continued until the quantity of gas produced exceeds the capacity of the holder then the excess of gas will escape to the outside of the building or to such place that it will do no injury to the occupants of the building and have no bad results except the loss of the excess of gas produced.

Another object of the invention is to provide a safety appliance which prevents the removal of the carbid-receptacle forming a part of the gas-generator without shutting off the valves in the pipes which lead therefrom into the gasometer.

The admission of water from the water-supply tank to the generator is regulated and the valve through which it is admitted automatically closed and opened by means of a lever which is actuated by the movable part of the gasometer, so that when the gasometer is nearly empty of gas the valve admitting water to the carbid is open, and as gas is generated and the gasometer filled and expanded, the valve gradually closes down and finally closes entirely, shutting off the access of fresh water to the carbid and stopping the production of gas. This automatic actuator of the valve is so arranged that as the gasometer fills more and more the valve closes more and more, the admission of water being reduced gradually, so that by the time the gasometer is filled with gas the water will have ceased to flow and the water which has previously been admitted to the carbid will have produced its chemical action on the carbid, and there will be very little moisture left in the generating-tank to continue the production of gas after the water has been once shut off.

The objects of the invention are attained by means of the device shown in the accompanying drawings, in which—

Figure 1 is an elevation of the several parts of a machine with the casing partly broken away, so that the interior arrangement of the pipes may be understood. Fig. 2 is an enlarged sectional view of the gas-generator, showing the means of clamping the carbid-receptacle to the cover of the generating-tank. Fig. 3 is an enlarged detail of the valve-actuating mechanism which regulates the supply of water from the water-tank to the generating-tank. Fig. 4 is a perspective showing the arrangement of the assembled machine.

In the drawings, A indicates the outside or fixed tank of the gasometer. This is similar to ordinary gasometers and consists of a tank arranged to be filled with water. Within it are contained the ends of the pipes which lead from the generator and pipes which lead to the place of service and other pipes which lead to a place of escape for excess of gas. Central to the tank A is a standard $g'$, over which telescopes a tube $g^2$, that is made fast to the movable part B of the gasometer. The standard $g'$ and the tube $g^2$ are merely the central guides, which retain the tank A and the bell B in proper position as one rises in the other.

Into the lower tank A enter on one side the inlet-pipe $e$, which leads gas from the generator I into the gasometer, the outlet-pipe $m$, which is the safety-pipe, and the outlet-pipe $g$, which is the service-pipe. All of these enter or pass through the walls of the fixed tank A near the bottom thereof and are provided with upturned bends, both inside and outside. The terminals on the inside rise above the normal water-level in the fixed tank A, and the terminals on the outside connect with piping that leads either to a place of escape, as the pipe $m$, or to a place of service, as the pipe $g$, or to the top of the generating-tank, as the pipe $e$.

On the outside of the fixed tank A and at or near the place where the several pipes described turn outward on the outside of that tank there are also downward-leading pipes, connecting with each of the pipes mentioned, which lead into the drip-tank E. These downward-leading ends of pipe are open; but that one which is connected with the service-pipe $g$ and is marked $g^3$ leads below the surface of the water in the drip-tank E and is sealed by that water. So also the end $o$ of the pipe which connects the inner end of the generating-pipe $e$ with the outer part of the generating-pipe $e$ at the bend of said pipe on the outside of the tank A terminates below the seal-water in the tank E. The portion $m'$ of the safety-pipe $m$ terminates in the same tank E, but above the seal-water. Thus all of the pipes are provided with means for collecting and discharging condensation-water, and all of the pipes which are generally in use for the conveyance of gas are thus sealed within the tank E. That one of the pipes $m$ which is only occasionally in use and is only in use when it is desirable to insure a safe discharge of an overproduction of gas is not sealed within this tank. This last pipe $m$ is, however, provided on the interior of the gasometer with a peculiar sealing arrangement. The upper end of the pipe $m$ terminates some distance above the normal surface of the water in the gasometer A, and over the pipe $m$ telescopes a loose tube $n$, the lower end of which extends down into the seal-water so far that it only rises above the seal-water when the bell B is so nearly filled with gas that it is desirable to discharge any further gas that may enter underneath it. When this point is reached, the lower end of the telescoping tube $n$ rises above the water or rises so high that a hole in it permits the gas to enter inside the outer tube $n$ and thence into the open end of the tube $m$, whence it escapes to the outer air. The telescoping tube $n$ is continued above the top of the bell B and capped in order to permit a considerable rise of the tube $m$ above the normal surface of the water.

The generating-tank I is a metallic receptacle arranged to be attached to or detached from the cover $t$ by means of a bar $j$, that enters holes in ears $k\ k'$ on the receptacle and is strained by a screw P, that presses against the cover $t$ and draws the receptacle I against the under side of the cover and against an interposed packing-gland $t'$. The cover $t$ of the gas-generator remains fixed with respect to the gasometer, being held in position by the pipes provided for the passage of gas and for the passage of water into the gas-generator. The receptacle I is removable, and in order to remove it the bar $j$ must be loosened, removed from the ears $k\ k'$, and the receptacle part of the generator dropped downward and in the fully-assembled machine drawn forward within the outer cooling-tank H.

Around the generating-tank I is placed a cooling-tank H. This is a tank of water resting on the base 2 of the machine and which can be removed after the generating-tank has been loosened from its fastenings. The generating-tank prevents its removal until so loosened, and the cooling-tank H prevents the removal of the generating-tank except in the way indicated.

At the bend of the pipe $e$, where it turns after rising from its passage through the cover $t$, is a valve D, actuated by a hand-lever $d$, which is so arranged that it extends downward in front of the tank I when the valve is open and must be turned to one side or the other to permit the tank I to be moved forward out of position. This emphatically calls the attention of the operator to the valve and causes him to close the valve D before attempting to remove the tank I from the fixed position on the cover. The cooling-tank H is partially filled with water, and the water serves to keep the tank I cool during the time that chemical action is going on within it and keeps the gas produced at a sufficiently low temperature to prevent the injurious effects of the high heat incident to the production of gas without a cooling appliance of that kind. The water in the tank H also serves as a support for the tank I and is especially useful in floating the tank I to its place when loaded with carbid, making the manipulation of the heavy tank much more easy and more readily operated by a single attendant than would be possible were it necessary for the attendant to lift the tank I to its place and hold it there while placing the bar $j$ in position. The water in the tank serves to hold the tank up against the cover until the attendant can secure it.

The water is fed into the generating-tank I from a supply-tank K, from the bottom of which a pipe C extends downward to a lower level than the bottom of the tank I, whence it turns upward to a higher level than the top of the tank I, giving to the pipe C the form of an inverted siphon, which provides an effectual seal against the back pressure of the gas, the seal of course being equal to the difference in level between the pipe $c'$ (which is the level portion of the pipe above the tank I) and the top of the water in the tank K. In the rising part of the pipe C is a valve $h$, actuated by a lever $h'$, which passes through a swivel-eye F on the sliding rod $f$, that is secured to the upper part of the bell B. The lower end of this rod $f$ is provided with an eye that runs on a guide-rod G, which is made fast to the lower part or fixed part A of the gasometer. As the bell B rises the rod $f$ rises with it, lifting the free end of the lever $h'$ and turning the plug of the valve $h$. The action in closing the valve is arranged to be fast during the first part of the movement and to become slower and slower as the bell rises until at a predetermined point the passage-way through the valve is entirely closed.

Into the pipe C enters a rising pipe $c^2$, which taps the pipe C below the tank K and provides means for clearing out with an air-pump or some similar forcing appliance the pipe C if by any chance dirt or any foreign material gets into it.

The packing-gland $t'$ is preferably contained in a groove in the cover $t$, and the inner wall of the groove is extended slightly downward to form a guide or ledge, outside of which the walls of the tank I engage the top edge of the tank I, thus pressing against the packing-gland, into which it embeds itself slightly, and thus forms a very tight joint at this part of the apparatus.

A pipe $w$ leads into the drip-collecting tank, terminating near the bottom of that tank, and this pipe $w$ serves the double purpose of furnishing access to the drip-tank for the purpose of filling it with water to produce a seal at the ends of the pipes leading into the tank, and later, after water begins to collect in said tank, the pipe $w$ serves as an escape or outlet for any excess of water that may collect in the drip-tank.

What I claim is—

1. In an acetylene-gas generator, the combination of a generating-tank cover fixed in position and having the various pipes secured thereto, a generating-tank located in part under said cover, means for securing said tank to said cover, a cooling-tank supported independent of said generating-tank and adapted to contain water to support or partly support said generating-tank, said cooling-tank being of such a size and shape as to permit of the introduction of said generating-tank, and its movement into position to be secured to said cover while said generating-tank is supported by said water, substantially as shown and for the purpose described.

2. In an acetylene-gas generator, in combination with an expansible gas-holder, a generating-tank, the cover of which is fixed with respect to the gas-holder, and the body of which is removable from said cover, a water-holding tank surrounding the generator adapted to hold a supply of water on which the generating-tank may be supported, substantially as described.

In testimony whereof I sign this specification in the presence of two witnesses.

FRANK W. PREUSSEL.

Witnesses:
FRANK S. PARKER,
CHARLES F. BURTON.